United States Patent [19]

Scudder et al.

[11] Patent Number: 5,269,731
[45] Date of Patent: Dec. 14, 1993

[54] DIFFERENTIAL UNIT HAVING ADJUSTABLE BEARING ASSEMBLIES

[75] Inventors: Royston C. Scudder, Sao Paulo, Brazil; Jun Yoshioka, Fort Wayne, Ind.

[73] Assignee: Dana Corporation, Toledo, Ohio

[21] Appl. No.: 785,040

[22] Filed: Oct. 30, 1991

[51] Int. Cl.[5] .................................. F16H 1/40
[52] U.S. Cl. ........................ 475/230; 475/246; 74/606 R
[58] Field of Search ............ 475/230, 231, 234, 246; 74/606 R

[56] References Cited

U.S. PATENT DOCUMENTS

| | | | |
|---|---|---|---|
| 1,506,037 | 8/1924 | Alden et al. | 475/246 |
| 1,946,051 | 2/1934 | Alden | 475/246 |
| 2,546,969 | 4/1951 | Buckendale | 475/246 |
| 3,260,132 | 7/1966 | West et al. | 475/246 X |
| 3,554,055 | 1/1971 | Galaniuk | 475/246 X |
| 3,715,936 | 2/1973 | Jones | 475/246 |

FOREIGN PATENT DOCUMENTS

| | | | |
|---|---|---|---|
| 1455882 | 8/1969 | Fed. Rep. of Germany | 475/246 |
| 683836 | 12/1952 | United Kingdom | 475/246 |
| 971500 | 9/1964 | United Kingdom | 475/246 |
| 1280670 | 7/1972 | United Kingdom | 475/246 |

Primary Examiner—Leslie A. Braun
Assistant Examiner—William O. Trousdell
Attorney, Agent, or Firm—Oldham, Oldham & Wilson Co.

[57] ABSTRACT

A vehicle differential unit including adjustable bearing assemblies has a differential carrier adapted to support a differential case assembly including differential case bearings associated therewith The differential case bearing assemblies rotatably support the differential case assembly within the carrier of the differential unit. Adjusting rings are provided and supported internally in a pair of axle tubes associated with the differential carrier. The adjusting rings are selectively biased against the bearing assemblies to impart the desired bearing preload and backlash within the differential unit. The adjusting rings replace the use of adjustment shims, and are accessible to permit adjustment if necessary without the need to remove the differential case assembly. The adjusting rings are threadably supported within the axle tubes to provide a rigid construction which simplifies constuction and adjustment of the differential unit.

10 Claims, 2 Drawing Sheets

5,269,731

DIFFERENTIAL UNIT HAVING ADJUSTABLE BEARING ASSEMBLIES

FIELD OF THE INVENTION

Background of the Invention

The invention relates in general to automotive differential units having an adjustable differential carrier and bearing mounting assembly.

Differential units for automotive or similar uses are well-known in the prior art, and generally comprise a differential case rotatably mounted in a differential carrier by spaced bearing assemblies adapted to accurately center the differential case within the differential carrier. A problem has existed in such differential units with respect to the mounting of the bearings for the differential case or rotor so as to provide the desired amount of backlash between the pinion and ring gear of the differential gear assembly or to eliminate end play of the rotor. Proper engagement of the ring gear carried by the differential case with the driving pinion is necessary for proper operation, and subsequent wear of the gears or bearings will result in misadjustment of backlash, thereby requiring adjustment of the bearings. Generally, the prior art differential case bearings have been made adjustable by means of adjustment shims used to provide preload on the differential case bearings. In the use of such adjustment shims, it is many times necessary to remove the differential case assembly to adjust backlash or bearing preload, which creates additional labor and adds cost to such an adjustment procedure.

There have been several attempts to provide differential units having adjustable bearing assemblies, but have heretofore been relatively complex. Such constructions have included various gear assemblies to effect adjustment of a plurality of shims. Other constructions have been found to degrade the structural integrity and rigidity of the differential unit in association with the axles of the vehicle. It is generally necessary to provide adequate stiffness or rigidity for the bearing assemblies in the differential unit, especially under heavy load conditions. In prior art constructions, an adjustment mechanism has been threadably engaged with the differential carrier wherein threading is provided on an internal surface thereof. As the differential carrier will normally be constructed of a softer case metal, this construction does not provide the desired structural integrity. Also, such threading procedures become more complicated and costly when performed within the differential carrier. Additionally, prior art bearing mounting assemblies which include an adjustment mechanism have generally resulted in a differential unit having increased costs associated with either the manufacture of the components or the assembly thereof.

SUMMARY OF THE INVENTION

Based upon the foregoing, there has been found a need to provide a bearing mounting assembly associated with a differential unit which facilitates easy adjustment of the bearing assembly. It is therefore a main object of the invention to provide an adjustable bearing assembly for a differential unit which overcomes the deficiencies of the prior art and permits adjustment of bearing preload and backlash within the differential unit without the use of adjustment shims.

In a preferred form, the differential unit comprises a differential carrier adapted to support a differential case assembly including differential case bearings associated therewith. The differential case bearing assemblies are rotatably supported on the differential case assembly relative to the carrier and gears of the differential unit. Adjusting rings are threadably engaged and supported internally in a pair of axle tubes associated with the differential carrier. The threaded engagement internally of the axle tubes simplifies manufacture and gives additional structural strength to the differential unit. The adjusting rings are selectively biased against the bearing assemblies to impart the desired bearing preload and backlash within the differential unit. The adjusting rings replace the use of adjustment shims, and are accessible to permit adjustment if necessary without the need to remove the differential case assembly. The construction of the differential unit simplifies manufacturing and gives more rigidity so as to maintain proper engagement of the ring and pinion gears.

BRIEF DESCRIPTION OF THE DRAWINGS

The above and further objects and advantages of the invention will become apparent upon the further reading of the detailed description of the preferred embodiment of the invention, taken in conjunction with the drawings, wherein.

DETAILED DESCRIPTION OF THE INVENTION

Figure 1:
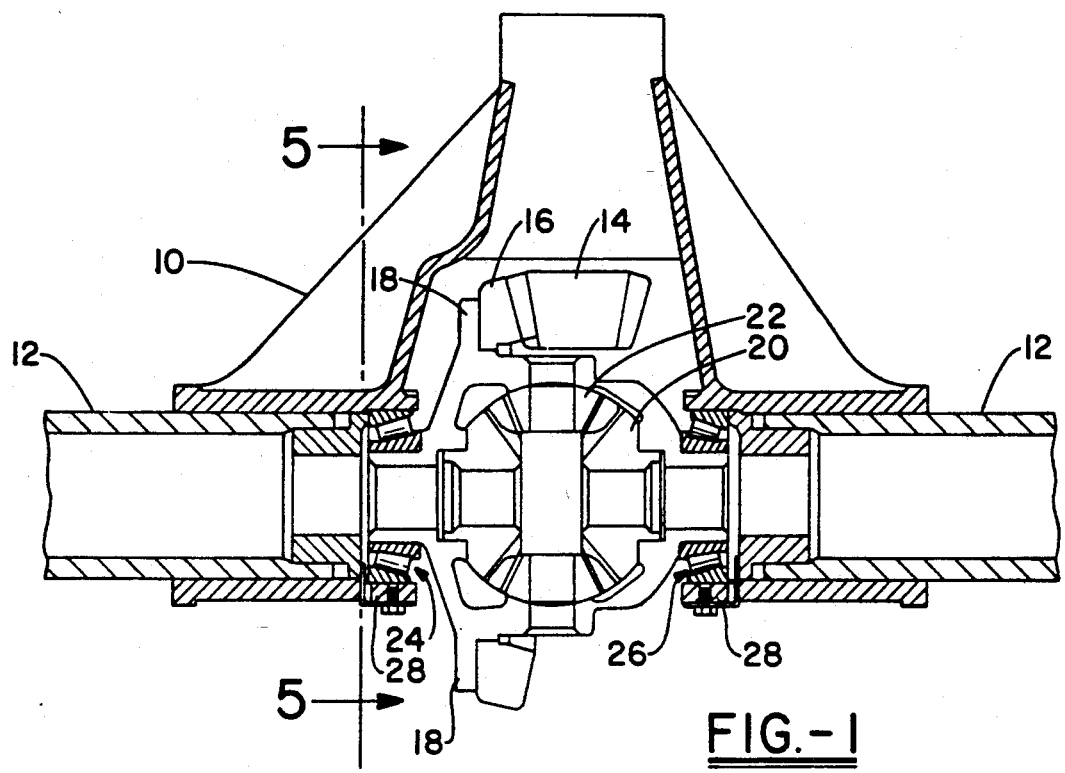
FIG. 1 is a partial cross-sectional view of a differential unit including the adjustable bearing assemblies of the invention.

Referring now to the drawings, and more specifically to FIG. 1, a vehicle differential unit includes a differential housing 10, which is assembled so as to be connected to rear wheel axle tubes 12. The differential carrier 10 is adapted to be secured to the underside of the vehicle. Motive power is fed into the differential through a power input pinion 14, which is secured on the end of a drive shaft (not shown). The power input pinion gear 14 is adapted to mesh with a ring gear 16, which is secured to the periphery of a differential rotor or case 18. The ring gear 16, and the differential case 18 to which it is attached, are rotated in the stationary differential carrier 10 by means of the pinion gear 14. The rotary motion of the differential case 18 is imparted to the drive axles and wheels (not shown), wherein the drive axles are coupled to an output beveled gear set 20 which permit each of the drive axles to be driven at different speeds. The differential case assembly 18 is substantially of conventional construction, and also includes a plurality of planetary gears 22 adapted to mesh with the opposed output gears 20. Efficient operation of the differential depends upon the precise centering of the differential case assembly 18 in the differential carrier 10 for proper meshing engagement of the ring gear 16 with the pinion gear 14. To accomplish this, the differential case 18 is rotatably supported in the differential carrier 10 by means of infinitely adjustable bearing assemblies indicated generally at 24 and 26. The bearing assemblies 24 and 26 are preferably provided as pre-assembled anti-friction bearing units having associated bearing caps 28 adapted to be bolted to a bearing block the differential carrier 10.

Figure 2:
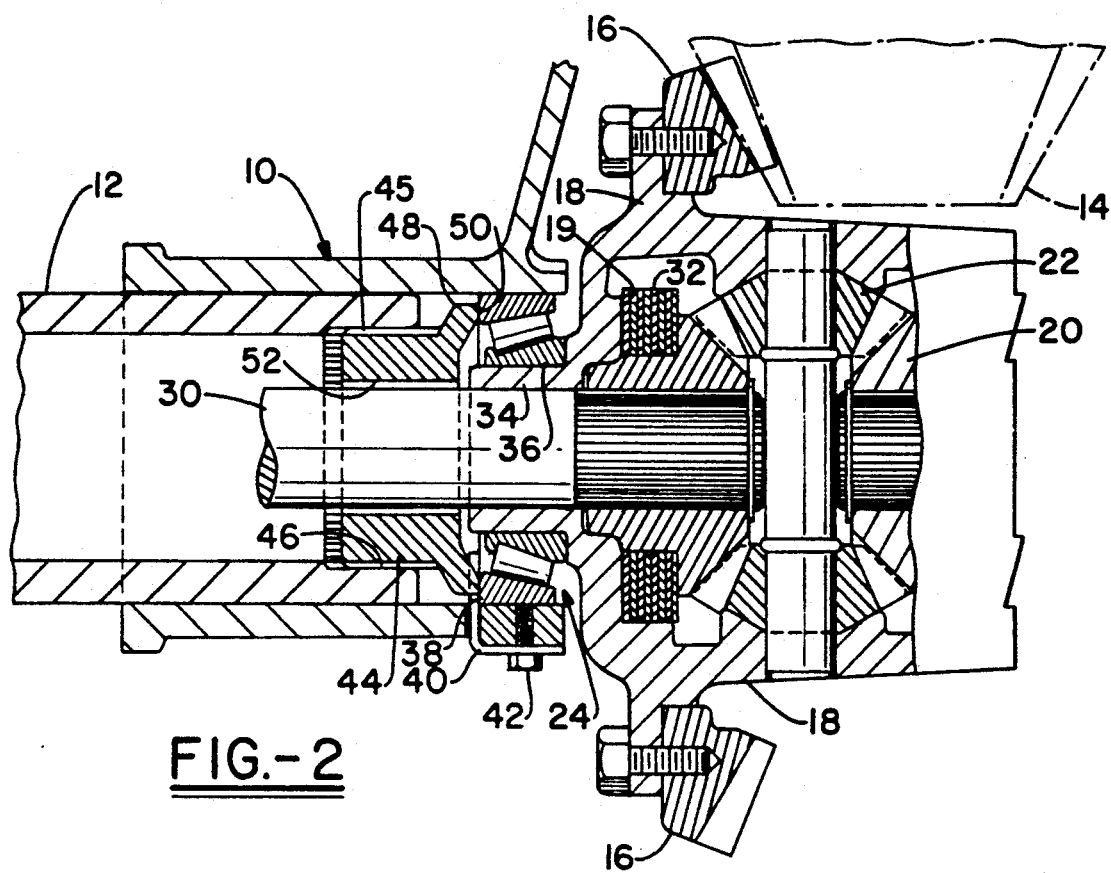
FIG. 2 is an enlarged partial cross-sectional view of one of the bearing assemblies in the differential units.

Turning to FIG. 2, one of the bearing assemblies of the invention is seen more distinctly. As seen in this figure, the plurality of planetary gears 22 respectively mesh with the opposed output gears 20, which are in turn secured to the axle shaft 30 disposed within axle tube 12. Interposed between each output gear 20 and an adjacent annular radial wall 19 of the differential case 20, is a limited slip clutch 32 of the conventional preloaded spring type, acting to minimize excessive slipping of one drive wheel relative to the other. The differential case 18 terminates at each lateral end with a cylindrical hub 34 adapted to be engaged by the inner race 36 of the pre-assembled anti-friction bearing unit 24. A tapered or wedge shaped outer bearing race 38 is supported by a semi-cylindrical bearing cap retainer 28. The bearing cap 28 has associated therewith a locking plate 40 which is secured to the bearing cap 28 by means of a bolt 42. Disposed within the interior of rear wheel axle tube 12 is an adjusting ring 44. The adjusting ring 44 is provided with external threads on surface 45, which are adapted to engage internal threading formed on surface 46 of axle tube 12. The provisions that the adjusting ring 44 be internally threadably engaged within an associated axle tube 12 has been found to simplify manufacture of the differential unit. Previous designs requiring internal threads to be formed in the differential carrier 10, complicates the manufacturing process. Additionally, as the differential carrier 10 is normally manufactured by casting techniques, and a relatively soft metal is utilized, problems of wearing and possible deformation occurred, especially under high loads. In the invention, the internal threading within the axle tube 12 is easily performed, and the construction allows a hardened steel adjusting ring 44 to be used in association with a hardened steel axle tube 12. This simplifies manufacture and facilitates proper load bearing in the adjusting ring 44 to maintain the desired structural integrity. For adjustment, the adjusting ring 44 will be rotated so as to thread into or out of the axle tube 12 for selective adjustment of its position relative to differential housing 10. The adjusting ring 44 includes an outer flange portion 48 having a contact surface 50 associated therewith, which is adapted to engage the tapered bearing race 38. The adjusting ring 44 therefore provides the load bearing structure supporting differential case 18 within carrier 10.

Figures 3, 4:
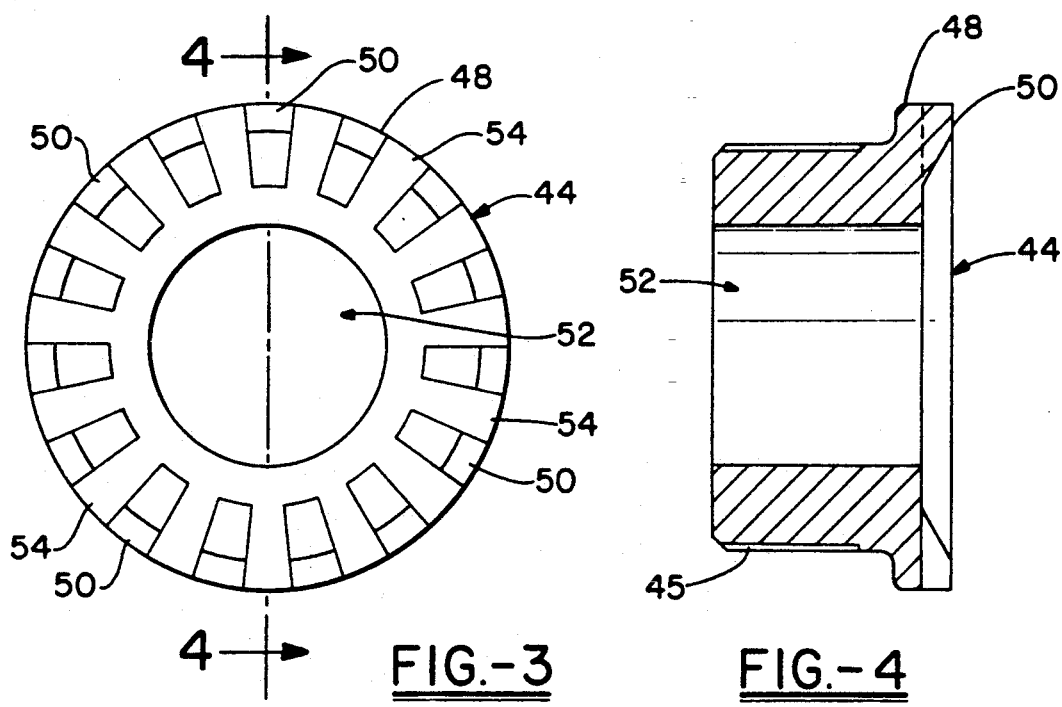
FIG. 3 shows a plan view of an adjusting ring to perform adjustment and locking of bearing preload and backlash characteristics in the differential unit.
FIG. 4 shows a cross-sectional view taken along the line 4—4 of FIG. 3.

The adjusting ring 44 is shown more distinctly in FIGS. 3 and 4, wherein it is seen that ring 44 is a cylindrical member having a center aperture 52 through which a vehicle drive axle extends. The threaded external surface 45 provides the engagement surface for securing the adjusting ring 44 to the interior of axle tube 12 as previously described. It should be evident that providing an externally threaded surface on the adjusting ring 44 in conjunction with an internal thread formed in axle tube 12 gives more rigidity than differential constructions which use screw threads in the differential carrier and bearing cap of the differential construction. Further, it is easier to machine a screw thread in the axle tube rather than in the differential carrier to provide a mechanism for adjustment of bearing preload and backlash.

Through a combination of casting and machining tolerances, it will be unlikely that the axial location of the differential rotor or case 18 will be properly positioned, and various problems will thus be encountered. Upon engagement of the bearing retaining cap 28 to seat the bearing assemblies, end play of the differential case 18 within the differential housing 10 will be observed along with possibly inaccurate axial positioning of the differential case resulting in improper engagement of the ring gear 16 with the pinion gear 14. For this reason, each anti-friction bearing assembly 24 and 26 of the differential unit may be adjustable to permit proper centering, and the application of a preselected preload on the differential case bearings. The bearing assemblies will also permit adjustment if necessary when preloading forces start to drop due to wear. Although in the preferred embodiment, both bearing assemblies 24 and 26 will be adjustable by means of an adjusting ring 44 and associated structure, adjustment may be provided for only one of the bearing assemblies 24 and 26 if desired. By means of the contact surface 50 of adjusting ring 44, the location of the tapered bearing race 38 is infinitely adjustable so as to provide the desired bearing preload and backlash in the differential unit. It is also seen in FIG. 3, that the adjusting ring 44 includes a plurality of slots 54 cut across one side thereof, which allow adjustment and locking of the adjustment ring 44 in the desired position. The slots 54 are spaced to allow any desired incremental change in the position of adjustment ring 44.

Figure 5:
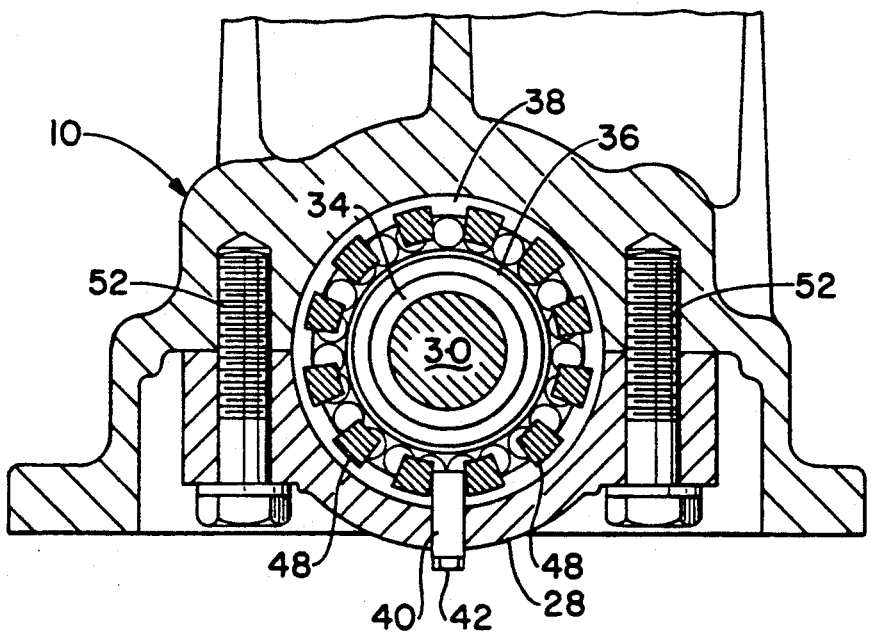
FIG. 5 shows a partial cross-sectional view taken along line 5—5 of FIG. 1.

As seen more distinctly with reference to FIGS. 2 and 5, the locking plate 40 is an "L" shaped member adapted to extend around the exterior of bearing cap 28. The locking plate is secured into engagement with the bearing cap 28 by means of a bolt 42. A portion of locking plate 40 is adapted to extend between differential housing 10 and bearing cap 28 to a position adjacent the differential case bearing assembly 24. The locking plate 40 is dimensioned so as to extend into one of the slots 54 of adjusting ring 44 so as to lock adjusting ring 44 in a selected position to impart the desired preload to the differential case bearings 24 and 26. The slots 54 also facilitate the selected rotation of adjusting ring 44 utilizing conventional tools. It should be evident that upon threading of adjusting ring 44 outwardly from axle tube 12, additional loading force is imparted to the outer bearing race 38. The tapered design of bearing race 38 essentially provides a ramp upon which the bearings of the assembly are carried. Upon the inward urging of the tapered bearing race 38, adjustment of the differential case bearing preload and backlash can be achieved. The inner race 36 of the bearing assemblies 24 and 26 is pressed onto a reduced end portion of the differential case 18 and against a thrust shoulder such that the bearing assembly will carry the thrust loads of the differential case in a single direction. The adjusting ring 44 will in turn carry the thrust load placed upon the bearing assembly to a great extent. As the internal threaded engagement of the adjusting ring 44 within axle tube 12 allows hardened steel parts to be used, these loads are better accommodated in this construction. It should be understood that the differential case bearing assembly at the opposite end of the differential case 18 as seen in FIG. 2, is identical to the bearing assembly as described, except that it will be reversed to carry a thrust load in the opposite direction as desired. By proper positioning of the bearing assemblies in the differential unit, end play between the differential case 18 and differential carrier 10 will be eliminated, and the differential case 18 may be centered in the carrier 10 for proper engagement of the ring gear 16 with pinion gear 14 during assembly of the differential case 18 to differential carrier 10.

In the assembly operation, axle tubes 12 associated with the drive axles of the vehicle are placed in the common differential carrier 10. The axle tubes are provide with internal threads as previously described and allow adjusting ring 44 to be threadably engaged internally within axle tubes 12. The adjusting rings 44 are initially fully retracted into the axle tubes 12 on both sides of the differential unit, to allow assembly of the differential case 18 within the differential carrier 10. The differential case assembly 18 is placed in the carrier 10 with the tapered differential case bearings assembled on both sides thereof. The bearing caps 28 are then mounted and the bolts 52 tightened to seat the bearing assemblies between differential case 18 and carrier 10. The adjusting ring 44 may then be rotated outwardly so as to be tightened against the anti-friction bearing assembly 24 on the ring gear 16 side of the differential case assembly 18, until there is no backlash between the pinion gear 14 and ring gear 16. The opposite adjusting ring 44 will then be tightened against the opposite differential case bearing assembly until the required backlash between pinion gear 14 and ring gear 16 is achieved. The bearing caps 28 may then be tightened to the required torque to maintain the centered position of differential case assembly 18 relative to differential carrier 10. After proper positioning and centering of the differential case assembly, the locking plate 40 may be positioned so as to extend into one of the slots 54 of the adjusting ring 44. The locking plates will be bolted to the bearing cap 28 by means of bolt 42 to fix their position and prevent further rotation of the adjusting rings 44. At this point, adjustment of the bearing preload and backlash is effected, and end play between the differential case assembly 18 and differential carrier 10 is eliminated. Proper meshing of the pinion gear 14 with ring gear 16 will allow maximum transmission of rotary motive power to the drive axles and wheels of the vehicle.

An advantage of the differential unit construction including the adjustable bearing assemblies is found in the ability to adjust the preload on the bearing assemblies without removal of the differential case assembly 18. For example, if backlash increases due to wear of the pinion gear 14 or ring gear 16, the preloading force on the differential case bearings is also reduced and requires adjustment for proper functioning of the differential. To accomplish such adjustment, the locking plates 40 are removed and the bearing cap bolts are loosened so as to slacken the bearing cap from its seating engagement with the bearing assembly. The adjusting ring 44 opposite the ring gear 16 may then be loosened slightly by rotating the adjustment ring 44 further into axle tube 12 through the threaded engagement therewith. The adjusting ring 44 on the ring gear 16 side of the differential case assembly 18 may then be tightened against the bearing assembly 24 of the differential case assembly. Such adjustment is continued until there is no backlash between the pinion gear 14 and ring gear 16 similar to initial assembly of the differential case assembly 18 with the differential carrier 10. The opposed adjusting ring 44 associated with bearing assembly 26 may then be tightened against the bearing assembly until the required backlash between pinion gear 14 and ring gear 16 is achieved. The bearing caps 28 may then be tightened to the required torque and the locking plates 40 replaced in their interengaging position with a slot 54 of the adjusting rings 44. The locking plates 40 may be secured in the desired position by bolts 42 to lock the adjusted position of the adjusting rings as desired.

From the foregoing description, it should be apparent that the invention permits rapid, convenient and accurate mounting of the differential case assembly of a vehicle differential unit in the proper axial position relative to the differential housing so as to eliminate end play of the differential case assembly and impart the desired bearing preload in the differential unit. In this way, proper intermeshing engagement of the ring gear carried by the differential case assembly with the power input pinion gear may be effected while introducing the desired amount of backlash between these gears. The construction of the invention allows adjustment of the bearing preload and backlash without removal of the differential case assembly, so as to greatly simplify initial as well as subsequent adjustments of the bearing assemblies. The provision of an adjusting ring which is threadably engaged on the interior of an axle tube supported in the differential housing provides a rigid and durable construction to prevent displacement or deflection of the differential case bearing assemblies, especially when high loads are transmitted through the differential unit. The construction of the adjusting rings within the axle tubes of the differential unit also provide for easier manufacturing as it is simpler to screw thread in a tube rather than in the differential carrier.

Although only one preferred embodiment has been shown and described herein, various modifications or alternative embodiments not specifically mentioned herein are contemplated and would be recognized by those skilled in the art. Therefore, the invention is only to be limited by the scope of the invention as defined in the appended claims.

What is claimed is:

1. A vehicle differential unit comprising,
   a differential housing having a differential case assembly mounted within said housing, said differential housing supporting at least a pair of axially spaced differential case anti-friction bearing assemblies which rotatably support and center said differential case assembly within the differential housing;
   said differential housing further including at least one outwardly extending axle tube supported therewith, with said at least one axle tube having an interior surface thereof adjacent said differential housing provided with screw threads;
   each of said bearing assemblies having an inner bearing race mounted in association with said differential case, and a tapered outer bearing race supported on said housing;
   at least one adjusting ring for adjustment of bearing preload, said at least one adjusting ring positioned within said at least one axle tube, having a portion of its exterior surface provided with screw threads so as to be threadably engaged within said at least one axle tube, and having a radially extending contact surface acting on said tapered outer bearing race, and
   a locking means associated with said differential housing to lock said at least one adjusting ring and prevent rotation of said adjusting ring from a preselected relative position with respect to said tapered outer bearing race, said adjusting means including a plurality of slots formed therein which are spaced from one another, with said locking means extending into at least one of said slots to allow incremental adjustment of bearing preload, wherein adjustment of bearing preload is effected by removal of said locking means making said adjusting ring accessible and adjustable from the exterior of said differential carrier to allow the position of said adjusting ring to be varied with respect to said tapered outer bearing race.

2. The differential unit as defined in claim 1, wherein, said housing includes a pair of axle tubes supported therein, each of said axle tubes including said threaded interior portion and an adjusting ring positioned and threadable engaged therein, said differential unit including a ring gear concentrically mounted on said differential case assembly so as to be engaged by a drive pinion gear, with the position of differential case assembly being determined by the relative positions of each of the differential case bearing assemblies, and engagement of said ring gear and pinion gear being adjusted by selectively positioning each of said adjusting rings relative to said bearing assemblies to result in predetermined backlash between said ring gear and said pinion gear.

3. The differential unit as defined in claim 1, wherein, said contact surface provided on said at least one adjusting ring is formed on an outwardly extending flange, with said contact surface formed at the outer peripheral edge of said flange for engagement with an end face of said tapered outer bearing race.

4. The differential unit as defined in claim 1, wherein, said adjusting ring includes a plurality of slots formed in a face of said adjusting ring adjacent said differential case, said slots being spaced to allow incremental adjustment of the preload on said bearing assembly, and said locking means comprises a locking plate which extends into at least one of said slots to lock the position of said adjusting ring.

5. The differential unit as defined in claim 1, wherein, said adjusting ring is accessible from the exterior of said differential case assembly, such that adjustment by rotation of said adjusting ring my be effected without removal of said differential case assembly.

6. The differential unit as defined in claim 1, wherein, said locking means comprises a locking plate which extends into at least one of said slots, with each of said tapered outer bearing races being retained in association with said housing by a bearing cap and said locking plate being selectively secured to said bearing cap in a position so as to extend into at least one of said slots to lock the position of said adjusting ring.

7. A differential unit for a vehicle comprising,
a unitary differential carrier comprising a housing and first and second outwardly extending axle tubes mounted therewith;
a differential case assembly rotatably supported within said differential carrier by first and second anti-friction bearing assemblies which are mounted in association with said unitary differential carrier,
at least one of said bearing assemblies being adjustable by means of an adjusting ring acting thereon, with said adjusting ring having a plurality of slots formed therein and being rotatably mounted within said axle tube, wherein rotation of said adjustment ring toward said bearing assembly acts to impart a desired preload onto said bearing assembly, said adjusting ring being accessible from the exterior of said differential carrier without removal of said differential case assembly and being selectively positioned and fixed in a predetermined position by locking means secured to said differential carrier and extending into at least one of said slots of said adjusting ring.

8. The differential unit as defined in claim 7, wherein, said first and second axle tubes are provided with internal screw threads at a position adjacent said differential carrier, and an adjusting ring is positioned within each of said first and second axle tubes which include external screw threads to allow threaded engagement of said adjusting ring within said axle tube to allow adjustment of each of said bearing assemblies.

9. The differential unit as defined in claim 7, further comprising,
a bearing retaining cap associated with each of said first and second bearing assemblies which secured to said differential carrier, wherein said adjusting ring is accessible between said bearing cap and said carrier to effect selective rotation thereof within said axle tube so as to allow adjustment of the preload on said bearing assembly without removal of said differential case assembly.

10. The differential unit as defined in claim 7, wherein,
said adjusting ring is provided with a plurality of slots formed on a face thereof adjacent said bearing assembly, and said locking means is a plate secured to said differential carrier and interengages said adjusting ring by means of at least one of said slots to lock the position of said adjusting ring.

* * * * *